US011027848B2

(12) United States Patent
Reinert

(10) Patent No.: US 11,027,848 B2
(45) Date of Patent: Jun. 8, 2021

(54) POWER PACK FOR THE SEAT-RELATED SUPPLY OF POWER TO AN ELECTRICAL UNIT, IN PARTICULAR IN AN AIRPLANE, AND METHOD FOR WIRELESS READING OUT OF STATUS INFORMATION OF A POWER PACK

(71) Applicant: KID-Systeme GmbH, Buxtehude (DE)

(72) Inventor: Marc Reinert, Buxtehude (DE)

(73) Assignee: KID-SYSTEME GMBH, Buxtehude (DE)

( * ) Notice: Subject to any disclaimer, the term of this patent is extended or adjusted under 35 U.S.C. 154(b) by 757 days.

(21) Appl. No.: 14/966,133

(22) Filed: Dec. 11, 2015

(65) Prior Publication Data
US 2016/0181841 A1    Jun. 23, 2016

(30) Foreign Application Priority Data

Dec. 18, 2014   (DE) ...................... 10 2014 018 669.5

(51) Int. Cl.
*H02J 7/00* (2006.01)
*B64D 11/06* (2006.01)
(Continued)

(52) U.S. Cl.
CPC ............ *B64D 11/0624* (2014.12); *G06F 1/26* (2013.01); *H02J 7/0047* (2013.01);
(Continued)

(58) Field of Classification Search
CPC ... B64D 11/0624; H02J 7/0054; H02J 7/0047; H02J 4/00; H02J 2310/44; G06F 1/26; G02B 6/0073; H04L 27/223
(Continued)

(56) References Cited

U.S. PATENT DOCUMENTS

| 2002/0130636 A1* | 9/2002 | Yokokura | ............ | H02J 7/0047 320/122 |
| 2006/0005055 A1* | 1/2006 | Potega | ................. | G06F 1/1632 713/300 |

(Continued)

FOREIGN PATENT DOCUMENTS

| AT | 501998 A1 | 12/2006 |
| DE | 4419190 | 12/1995 |

(Continued)

OTHER PUBLICATIONS

German Search Report, dated Sep. 1, 2017, priority document.
(Continued)

*Primary Examiner* — Zixuan Zhou
(74) *Attorney, Agent, or Firm* — Greer, Burns & Crain, Ltd.

(57) ABSTRACT

A power pack for a seat-related supply of power, such as an airplane seat, to an electrical unit having an interface for outputting status information. The interface is configured to provide an optical output of the status information. A method for wirelessly reading out status information of the power pack includes the steps of collecting status information, optically transmitting the collected status information, receiving the collected status information with a mobile receive device, and representing the collected status information on the mobile receive device.

13 Claims, 1 Drawing Sheet

(51) Int. Cl.
*G06F 1/26* (2006.01)
*H02J 4/00* (2006.01)
*H04L 27/22* (2006.01)
*F21V 8/00* (2006.01)

(52) U.S. Cl.
CPC .............. *G02B 6/0073* (2013.01); *H02J 4/00* (2013.01); *H04L 27/223* (2013.01)

(58) Field of Classification Search
USPC .................. 320/103, 112–115, 134, 136
See application file for complete search history.

(56) References Cited

U.S. PATENT DOCUMENTS

| | | | | |
|---|---|---|---|---|
| 2006/0135217 A1* | 6/2006 | Sung | ............ | H02J 7/0044 455/573 |
| 2007/0098407 A1* | 5/2007 | Hebrank | ............ | G08C 23/04 398/106 |
| 2007/0139972 A1 | 6/2007 | Eckl et al. | | |
| 2009/0149971 A1* | 6/2009 | Siff | ............ | A61N 1/0408 700/79 |
| 2010/0201166 A1 | 8/2010 | Merensky et al. | | |
| 2013/0020779 A1* | 1/2013 | Green | ............ | A61G 5/1067 280/200 |
| 2013/0236192 A1* | 9/2013 | Deicke | ............ | G06F 1/1632 398/135 |
| 2014/0361740 A1* | 12/2014 | Suzuki | ............ | H02J 7/0027 320/108 |

FOREIGN PATENT DOCUMENTS

DE  102009006758  8/2010
EP  3012785  4/2016

OTHER PUBLICATIONS

Producktblatt des Netzteils: Ventura—DP155.CHP—PULS Power Supply, der Firma PULS-Muenchen, Arabellastr. 15, D-81925 Muenchen, URL=www.pulspower.com/fileadmin/Dateien/pdf/dp155.pdf, Jan. 9, 2017.

* cited by examiner

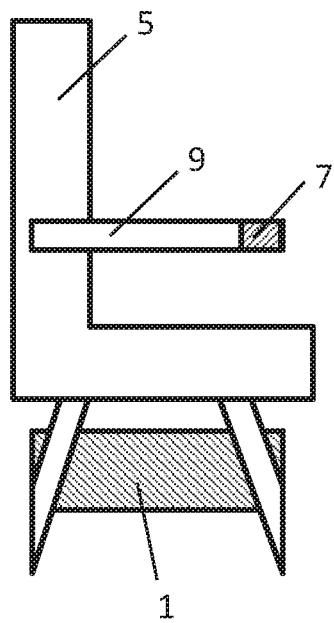
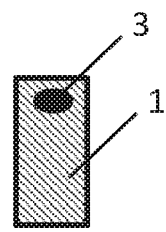
FIG 1
FIG 2
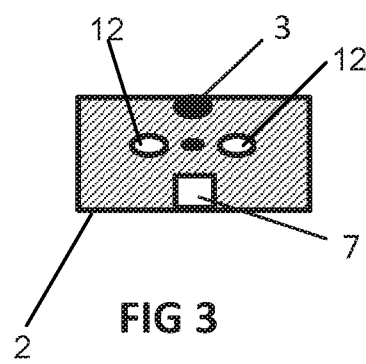
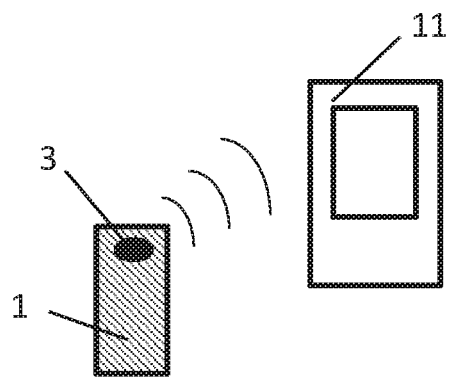
FIG 3
FIG 4

POWER PACK FOR THE SEAT-RELATED SUPPLY OF POWER TO AN ELECTRICAL UNIT, IN PARTICULAR IN AN AIRPLANE, AND METHOD FOR WIRELESS READING OUT OF STATUS INFORMATION OF A POWER PACK

CROSS-REFERENCES TO RELATED APPLICATIONS

This application claims the benefit of the German patent application No. 102014018669 filed on Dec. 18, 2014, the entire disclosures of which are incorporated herein by way of reference.

BACKGROUND OF THE INVENTION

The present invention relates to a power pack for the seat-related supply of power to an electrical unit, in particular in an airplane, having an interface for outputting status information, and to a method for wireless reading out of status information of a power pack for seat-related supply of power to an electrical unit, in particular in an airplane.

The power packs described in the present application are preferably used to supply power for personal electronic devices (e.g., laptops, tablets, or smartphones) of passengers on an airplane. However, it is also possible for such a power pack to enable the supply of power to other seat-related electrical units. Such an electrical unit can for example be a motoric controlling of the passenger seat. In their respective processor, the so-called device processing unit, these power packs process and store particular error information or status information, e.g., whether a laptop or smartphone is connected, whether power supply errors have occurred, or how high a consumed load is. For example, in the case of overload or short circuit, excessive temperature or low voltage levels can cause the power pack output to be shut off, and corresponding error information is stored. This information however cannot be read out without taking apart the power pack. For the large number of passenger seats in an airplane, the disassembly of the power pack in order to check the power supply represents a large outlay of time for maintenance. For safety reasons, reading out via original airplane data can be undesirable if these information systems are to remain separate from one another.

Known power packs for seat-related supply of power to an electrical unit, in particular in an airplane, are programmable, or, as mentioned above, can be read out electronically after disassembly. Some power packs have serial interfaces, such as RS232, RS485, or Ethernet, which, however, require a wired connection to the data receiver in order to read out the information. In current installations, such a wired connection is, however, in most cases undesirable, so that the wiring for maintenance has to be provided separately. This also results in a high time expense during maintenance, because, for example, covers have to be removed. In addition, such interfaces are bidirectional, so that additional protection is necessary in order to prevent loading of data to the power pack. In addition, such known interfaces are galvanically connected to the power pack, which requires protective mechanisms so that neither maintenance equipment nor the power pack itself can be damaged, for example, by electrostatic charging. A safe electrical separation from the high voltage of the airplane power supply is also subject to particularly strict safety requirements. All of these points are associated either with increased weight of the airplane or longer maintenance time.

SUMMARY OF THE INVENTION

Thus, in a first aspect it is an object of the present invention to provide a power pack for seat-related supply of power to an electrical unit, in particular in an airplane, having an interface for outputting status information that is easily accessible and that enables a secure and simple exchange of data.

In a second aspect, it is in addition an object of the present invention to provide a simple and time-saving method for wireless reading out of status information of a power pack for seat-related supply of power to an electrical unit, in particular in an airplane.

Here, the term "status information" also includes error information or error protocols as described above

BRIEF DESCRIPTION OF THE DRAWINGS

In the following, the present invention is explained with reference to the drawings.

FIG. 1 shows a side view of the power pack according to the present invention, situated underneath a seat.

FIG. 2 shows a front view of the power pack according to the present invention, with a schematic representation of the interface.

FIG. 3 shows a front view of a plug receptacle having an interface according to the present invention.

FIG. 4 shows a front view of the power pack in communication with a mobile device according to the present invention, with schematic representations of the interface and of the collected status information on the mobile receive device.

DETAILED DESCRIPTION OF THE PREFERRED EMBODIMENTS

The solution according to the present invention of the first aspect comprises, as shown in FIGS. 1 and 2, a power pack 1 for seat-related supply of power to an electrical unit 2, in particular in an airplane, having an interface 3 for outputting status information, the outputting of the status information taking place optically. This has the advantage that interface 3 communicates only unidirectionally, so that no data can reach the power pack 1. Galvanically as well, the interface 3 is in this way decoupled from a readout system.

The optical outputting of the seat-related status information preferably takes place using a light-emitting diode (LED). Standardly, these are small, inconspicuous, and robust; i.e., they do not immediately attract the notice of a passenger, and also do not easily fail.

In a further preferred specific embodiment, the interface 3, i.e., for example an LED, is situated on the power pack 1. This is standardly situated underneath an airplane seat 5, so that the LED is outside the immediate field of view of a passenger. This configuration has the advantage that the electrical paths are short, and thus may require less maintenance.

Further preferably, the power pack 1 for the seat-related supply of power to the electrical unit 2 is fashioned such that the interface 3 is situated on the electrical unit 2. In this way, flexibility is possible with regard to the reading out of the status information.

In a further preferred specific embodiment (see FIG. 3), the interface 3, which is preferably an LED, is situated on a plug receptacle 7 electrically connected to the power pack. This has the advantage that LEDs that are also already present there can be used for this purpose, and that, in order to read out the status information, maintenance personnel do not have to bend down to the interfaces 3 situated underneath each seat, in the already-tight space conditions of an airplane; rather, the interfaces 3 can preferably be housed at easily accessible positions.

This can, for example, be at a plug receptacle 7 in an armrest 9 of the airplane seat 5, or at some other location to which an electrical line is already routed.

The solution according to the present invention of the second aspect (see FIG. 4) relates to a method for wireless reading out of status information of a power pack 1 according to the present invention for seat-related supply of power to an electrical unit 2, in particular in an airplane, having the steps: collection of status information, optical transmission of the collected status information, reception of the collected status information with a mobile receive device 11, and representation of the collected status information on the mobile receive device 11.

Here, the term "collection" also means "storage."

The optical transmission preferably takes place through a coded optical sending out of status or error information via an LED. This can take place not only in the visible wavelength range, but for example also in the UV range.

With such a method, it is possible for the maintenance personnel, for example, using a camera of a smartphone 11, to read out the status information of each power pack 1 for power supply of an airplane seat 5, and subsequently to recognize the needed repair quickly and easily using an application installed on the smartphone.

Preferably, the step of optical transmission takes place only after an initiation, for example, a particular key combination of a switch 12. In this way, it can be ensured that only authorized maintenance personnel have access to the data.

A particular advantage of the method according to the present invention is that for the collection and transmission or reception of status information a complicated network, including permanent or temporary cables, is not necessary, so that both time during maintenance and weight during installation can be saved.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for the wireless reading out of status information of a power pack for a seat-related supply of power to an electrical unit having an interface for outputting status information, wherein the interface is configured to provide an optical output of the status information, comprising the steps:

collecting status information at the power pack, optically transmitting the collected status information with a unidirectional light transmitting device, using a mobile receive device to receive the collected and optically transmitted status information and not using the mobile receive device to transmit data to the power pack, and representing the collected status information on the mobile receive device, wherein the power pack is mounted in an airplane seat.

2. The method as recited in claim 1, the optically transmitting step taking place only after an initiation step performed by an operator of the mobile receive device.

3. The method as recited in claim 2, the initiation step including an actuation of a switch performed by the operator of the mobile receive device.

4. The method as recited in claim 1, wherein the interface comprises an LED to provide the unidirectional optical output of the status information.

5. The method as recited in claim 1, wherein the interface is situated on a plug receptacle that is electrically connected to the power pack.

6. The method as recited in claim 1, wherein the plug receptacle is situated in an armrest of the airplane seat.

7. A method for the wireless reading out of status information of a power pack for a seat-related supply of power to an electrical unit having an interface for outputting status information, wherein the interface is configured to provide an optical output of the status information, comprising the steps:

collecting status information at the power pack, optically transmitting the collected status information to a mobile receive device with a unidirectional light transmitting device while isolating the power pack against receiving data from the mobile receive device, receiving the collected and optically transmitted status information with the mobile receive device, and representing the collected status information on the mobile receive device.

8. A method for the wireless reading out of status information of a power pack for a seat-related supply of power to an electrical unit having an interface for outputting status information, wherein the interface is configured to provide an optical output of the status information, comprising the steps:

collecting status information at the power pack, optically transmitting the collected status information with a unidirectional light transmitting device, using a mobile receive device to receive the collected and optically transmitted status information and not using the mobile receive device to transmit data to the power pack, and representing the collected status information on the mobile receive device, wherein the interface is situated on a plug receptacle that is electrically connected to the power pack.

9. The method as recited in claim 8, the optically transmitting step taking place only after an initiation step performed by an operator of the mobile receive device.

10. The method as recited in claim 9, the initiation step including an actuation of a switch performed by the operator of the mobile receive device.

11. The method as recited in claim 8, wherein the interface comprises an LED to provide the unidirectional optical output of the status information.

12. The method as recited in claim 8, wherein the power pack is mounted in an airplane seat.

13. The method as recited in claim 12, wherein the plug receptacle is situated in an armrest of the airplane seat.

\* \* \* \* \*